United States Patent
Chung

(10) Patent No.: US 9,720,518 B2
(45) Date of Patent: Aug. 1, 2017

(54) CHARACTER INPUT APPARATUS AND CHARACTER INPUT METHOD

(71) Applicant: NEOPAD, INC., Seoul (KR)

(72) Inventor: Hee Sung Chung, Seoul (KR)

(73) Assignee: NEOPAD, INC., Seoul (KR)

( * ) Notice: Subject to any disclaimer, the term of this patent is extended or adjusted under 35 U.S.C. 154(b) by 105 days.

(21) Appl. No.: 14/779,167

(22) PCT Filed: Apr. 4, 2013

(86) PCT No.: PCT/KR2013/002791
§ 371 (c)(1),
(2) Date: Sep. 22, 2015

(87) PCT Pub. No.: WO2014/148670
PCT Pub. Date: Sep. 25, 2014

(65) Prior Publication Data
US 2016/0054810 A1    Feb. 25, 2016

(30) Foreign Application Priority Data

Mar. 22, 2013  (KR) ........................ 10-2013-0030999

(51) Int. Cl.
*G06F 3/023*     (2006.01)
*G06F 3/0488*    (2013.01)
(Continued)

(52) U.S. Cl.
CPC .......... *G06F 3/0236* (2013.01); *G06F 3/0412* (2013.01); *G06F 3/0486* (2013.01);
(Continued)

(58) Field of Classification Search
None
See application file for complete search history.

(56) References Cited

U.S. PATENT DOCUMENTS 8,884,790 B2 * 11/2014 Page ................... G06F 3/0235
178/17 C
2016/0041965 A1 * 2/2016 Ghassabian ............ G06F 3/005
715/261

FOREIGN PATENT DOCUMENTS

JP    2000-029630 A    1/2000
JP    2009-266236 A    11/2009
(Continued)

OTHER PUBLICATIONS

Search Report for International Application No. PCT/KR2013/002791.
(Continued)

*Primary Examiner* — Kenneth B Lee, Jr.
(74) *Attorney, Agent, or Firm* — LRK Patent Law Firm

(57) ABSTRACT

Character input apparatus includes: touch screen; first keypad information database storing information on first keypad; second keypad information database storing information on second keypad; first keypad generation unit displaying the first keypad including character key on the touch screen during character input mode; first key touch recognition unit acquiring character code corresponding to first key from the first keypad information database and invoking second keypad generation unit, when the first key is sensed on the first keypad; the second keypad generation unit generating the second keypad including character keys related to the first key by invocation by the first key touch recognition unit, and displaying the second keypad on the touch screen; and second key touch recognition unit acquiring character corresponding to touch movement action from the second keypad information database and displaying the character on the touch screen, when the touch movement action is sensed on the second keypad.

15 Claims, 13 Drawing Sheets

(51) Int. Cl.
    *G06F 3/041*     (2006.01)
    *G06F 3/0486*    (2013.01)
(52) U.S. Cl.
    CPC ...... *G06F 3/04883* (2013.01); *G06F 3/04886* (2013.01); *G06F 2203/04803* (2013.01)

(56) References Cited

FOREIGN PATENT DOCUMENTS

| | | |
|---|---|---|
| KR | 10-2009-0040520 A | 4/2009 |
| KR | 10-2010-0024563 A | 3/2010 |
| KR | 10-2010-0089807 A | 8/2010 |
| KR | 10-2011-0064629 A | 6/2011 |
| KR | 10-2011-0136219 A | 12/2011 |
| KR | 10-2012-0077890 A | 7/2012 |

OTHER PUBLICATIONS

Written Opinion for International Application No. PCT/KR2013/002791.

JPO Office Action for Japanese Application No. 2016-505367, mailed on Feb. 28, 2017, which corresponds to the above-referenced U.S. application.

* cited by examiner

| Center point coordinate value of first key (x, y) | Center point coordinate value of first key (x, y) | First key code (Unicode) | Character label |
|---|---|---|---|
| (30, 40) | red (02) | 0041 | A |

| Center point coordinate value of character key on second keypad (x, y) | Code of character key on second keypad | Character label |
|---|---|---|
| (40, 50) | 0042 | B |

(a)

| Center point color value of character key on second keypad | Center point coordinate value of character key | Character key code | Character key label |
|---|---|---|---|
| Red | (50, 50) | 0043 | C |

(b)

| Code value of first key | Touch move direction | Code of character key on second keypad | Character key label |
|---|---|---|---|
| 0043 | right | 0044 | F |

CHARACTER INPUT APPARATUS AND CHARACTER INPUT METHOD

BACKGROUND OF THE INVENTION

1. Field of the Invention

The present invention relates to a character input apparatus and a character input method, and more specifically, to a character input apparatus and a character input method, which can input characters with ease by doubly providing character keypads in the character input apparatus capable of character input through a touch action.

2. Background of the Related Art

Recently, various computing devices capable of character input in a touch or non-touch manner are widely distributed.

A means for inputting data such as a character or the like in a computing device capable of touch input includes a keyboard, a keypad or the like implemented in software and provided on a screen.

A method of inputting a character by touch in such a computing device is emerged as an important user interface technique together with advancement in hardware and software.

In addition, considering potential for development in information communication devices such as a wearable computer, a flexible display smart phone and the like and diversification of user classes and the like, a new character input technique optimized to a user is required.

However, a character input technique currently used in a computing device capable of touch input is not much different from a hardware keyboard type technique of the past and a method using thereof. For example, when it is desired to input a character using an existing technique in a keypad of a flexible form, it is difficult to assign a character key on a curved touch panel, and thus there are a lot of problems such as a character input error occurred by a key tapping action.

In addition, a size of a touch screen provided in a portable terminal is also limited due to the limited size of the portable terminal. Accordingly, if a virtual keyboard of a QWERTY type is used when it is desired to input a character by displaying a virtual keypad on a touch screen of the portable terminal, there is a problem in that the area allocated to a key decreases. This invites inconvenience in correctly touching a key desired to be input by a user and, as a result, generates a problem of frequent error input such as touching an area out of the center of the key.

Accordingly, considering potential for development in computing devices and environments and classes of users, an improved character input method if required.

SUMMARY OF THE INVENTION

Therefore, the present invention has been made in view of the above problems, and it is an object of the present invention to provide a character input apparatus and a method thereof, which can input characters rapidly and conveniently while reducing error input by doubly providing keypads in a touch or non-touch action type character input apparatus of various materials and forms.

Another object of the present invention is to provide a character input apparatus and a method thereof, which can input a character more correctly and flexibly by virtually providing a second keypad, on which characters that can be input by touch movement of a user are displayed, when a touch start is sensed on a first keypad which is a real keypad.

Still another object of the present invention is to provide a character input apparatus and a method thereof, which can input a plurality of characters through a touch start character key without pressing keys several times in inputting characters using a touch screen.

Still another object of the present invention is to provide a character input apparatus and a method thereof, which can improve speed of character input by displaying a complete character on a screen through one touch and touch move action on a touch-type keypad.

Still another object of the present invention is to provide a character input apparatus and a method thereof, which can improve efficiency of character input by reducing a fingering distance required for character input in the character input environments of various users, improving correctness of character key touch and minimizing movements of a hand.

To accomplish the above objects, according to one aspect of the present invention, there is provided a character input apparatus including: a touch screen; a first keypad information database for storing information on a first keypad; a second keypad information database for storing information on a second keypad; a first keypad creation unit for displaying the first keypad configured of at least one or more character keys on the touch screen in a case of character input mode; a first key touch recognition unit for acquiring, if touch of a first key is sensed on the first keypad, a character code corresponding to a value of the first key from the first keypad information database and calling a second keypad creation unit; the second keypad creation unit for creating a second keypad including character keys related to the first key and virtually displaying the second keypad on the touch screen, in response to the call of the first key touch recognition unit; and a second key touch recognition unit for acquiring, if a touch move action is sensed on the second keypad, a character corresponding to the touch move action from the second keypad information database and displaying the character on the touch screen.

The first keypad creation unit may create a first keypad configured of character keys having at least one of forms of a dot, a straight line, a curved line, a polygon, a circle and a color.

The first keypad information database may store at least one of a coordinate value according to a form and a size of a character key configuring the first keypad, a center point coordinate value or a center point color value of the character key arranged on the first keypad, and a character code and a character label corresponding to the center point coordinate value or the center point color value.

If touch of the first key is sensed on the first keypad, the first key touch recognition unit may acquire a center point coordinate value or a center point color value corresponding to the first key and extract a character code corresponding to the acquired center point coordinate value or center point color value from the first keypad information database.

The second keypad information database may store at least one of a coordinate value according to a form and a size of the second keypad corresponding to each key of the first keypad, a center point coordinate value or a center point color value of a character key arranged on the second keypad, a character code and a character label on the second keypad corresponding to the center point coordinate value or the center point color value, and a character code and a character label on the second keypad corresponding to a character code of the first keypad (→ key) and touch move direction information.

The second keypad creation unit may create a second keypad including a predetermined number of character keys arranged around the first key or create a second keypad including a predetermined number of character keys frequently used together with the first key based on a character key use pattern.

In addition, the second keypad creation unit may virtually create the second keypad in at least one of upward, downward, leftward, rightward and diagonal directions.

In addition, the second keypad creation unit may visibly or invisibly create a virtual second keypad inside or outside of the first key of the first keypad.

In addition, the second keypad creation unit may create a second keypad configured of character keys having at least one of forms of a dot, a straight line, a curved line, a polygon, a circle and a color.

The touch move action may include at least one of dragging, flicking and sliding and can be an action continued from a first key touch action.

The second key touch recognition unit may acquire a coordinate value or a color value according to a touch move action on the second keypad, extract a character code corresponding to the acquired value from the second keypad information database, and display a character corresponding to the extracted character code on the touch screen.

In addition, the second key touch recognition unit may acquire a coordinate value according to the touch move action on the second keypad, detect touch move direction information through an operation on the center point coordinate value of the first key and the coordinate value according to the touch move action, extract a character code corresponding to a combination of the character code of the first key and the touch move direction information by searching the second keypad information database, and display a character corresponding to the extracted character code on the touch screen.

In addition, the second key touch recognition unit may detect the touch move direction information through a subtraction operation on the center point coordinate value of the first key and the coordinate value according to the touch move action.

According to another aspect of the present invention, there is provided a method of inputting a character in a character input apparatus provided with a touch screen, the method including: (a) a step of displaying a first keypad configured of at least one or more character keys on the touch screen in a case of character input mode; (b) a step of acquiring, if touch of a first key is sensed on the first keypad, a character code corresponding to a value of the first key, creating a second keypad including character keys related to the first key and displaying the second keypad on the touch screen; and (c) a step of displaying, if a touch move action is sensed on the second keypad, a character corresponding to the touch move action on the touch screen.

The first keypad may be configured of character keys having at least one of forms of a dot, a straight line, a curved line, a polygon, a circle and a color.

The step (b) may include: a step of acquiring, if touch of a first key is sensed on the first keypad, a center point coordinate value or a center point color value of the first key; a step of acquiring a character code corresponding to the center point coordinate value or the center point color value of the first key by searching a first keypad information database provided in advance; and a step of creating a second keypad including a predetermined number of character keys arranged around the first key and displaying the second keypad on the touch screen, or creating a second keypad including a predetermined number of character keys frequently used together with the first key based on a character key use pattern and displaying the second keypad on the touch screen.

The step (c) may include: a step of acquiring, if a touch move action is sensed on the second keypad, a center point coordinate value or a center point color value of a character key according to the touch move action; a step of extracting a character code corresponding to the center point coordinate value or the center point color value of the character key by searching a second keypad information database provided in advance; and a step of displaying, if the touch movement is completed, a character corresponding to the extracted character code on the touch screen.

In addition, the step (c) may include: a step of acquiring, if a touch move action is sensed on the second keypad, a coordinate value according to the touch move action; a step of detecting touch move direction information through an operation on the center point coordinate value of the first key and the coordinate value according to the touch move action; a step of extracting a character code corresponding to a combination of the character code of the first key and the touch move direction information by searching a second keypad information database provided in advance; and a step of displaying, if the touch movement is completed, a character corresponding to the extracted character code on the touch screen.

The touch move direction information may be obtained through a subtraction operation on the center point coordinate value of the first key and a coordinate value according to the touch move action.

If a touch move action is not sensed on the second keypad, a character corresponding to the acquired character code corresponding to the value of the first key may be displayed on the touch screen.

The second keypad may be virtually created in at least one of upward, downward, leftward, rightward and diagonal directions.

In addition, the second keypad may be virtually and visibly or invisibly created inside or outside of the first key of the first keypad.

In addition, the second keypad may be configured of character keys having at least one of forms of a dot, a straight line, a curved line, a polygon, a circle and a color.

The touch move action may include at least one of dragging, flicking and sliding and can be an action continued from a first key touch action.

BRIEF DESCRIPTION OF THE DRAWINGS

FIG. 3 is an exemplary view showing the structure of a second keypad information database according to an embodiment of the present invention.

DESCRIPTION OF SYMBOLS

- 100: Character input apparatus
- 110: Touch screen
- 120: Storage unit
- 130: Database
- 140: First keypad creation unit
- 150: First key touch recognition unit
- 160: Second keypad creation unit
- 170: Second key touch recognition unit

DETAILED DESCRIPTION OF THE PREFERRED EMBODIMENT

Details of the objects and technical configuration of the present invention and operational effects according thereto will be more clearly understood by the detailed description described below based on the accompanying drawings attached in the specification of the present invention.

A first keypad and a second keypad described hereinafter may be referred to as a real keypad and a virtual keypad, respectively. The second keypad is virtually created on the first keypad, and the first keypad and the second keypad are respectively configured of an independent character key structure and independent codes and provided with an independent character input mode. In addition, character input on the first keypad is accomplished by a tapping action, and character input at the second keypad is accomplished by a touch move action such as sliding (pushing), flicking or the like.

Figures 1, 2:
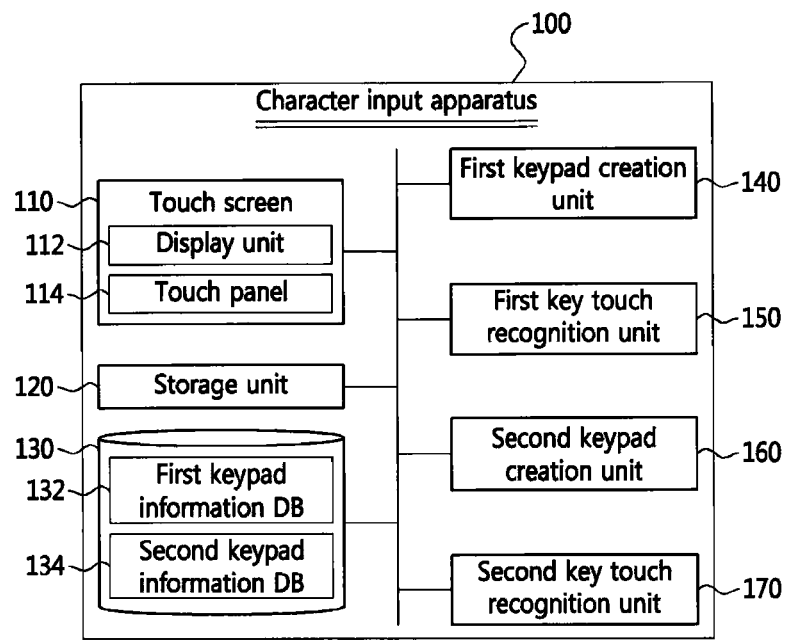
FIG. 1 is a block diagram schematically showing the configuration of a character input device according to an embodiment of the present invention.
FIG. 2 is an exemplary view showing the structure of a first keypad information database according to an embodiment of the present invention.
Figure 4:
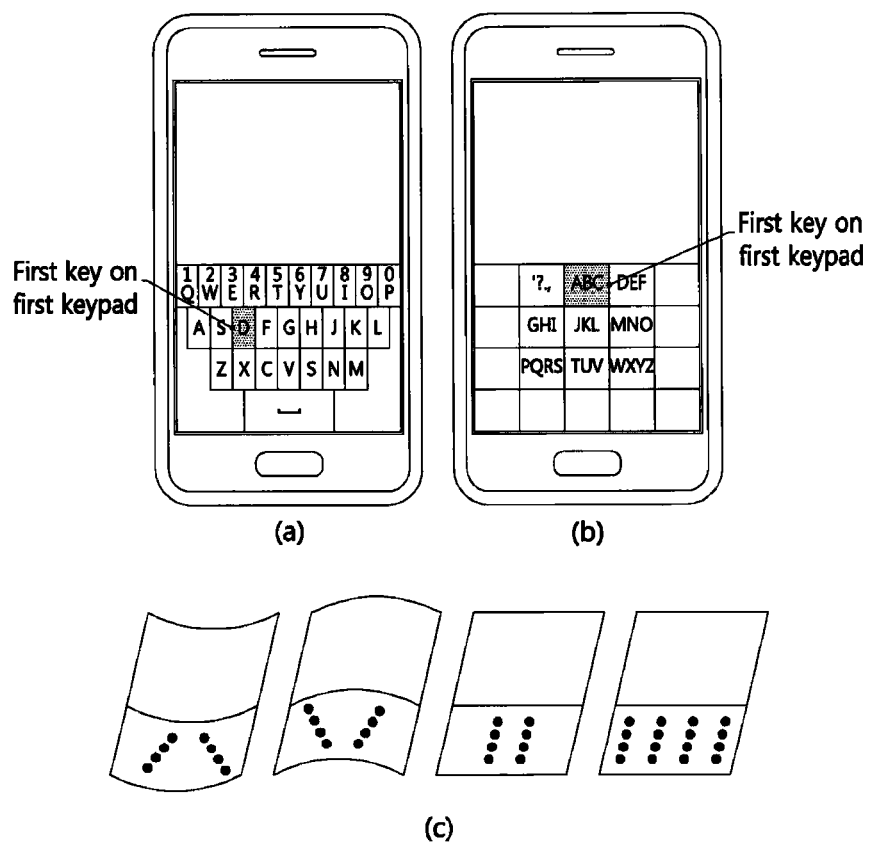
FIG. 4 is an exemplary view showing a first keypad according to an embodiment of the present invention.
Figure 5:
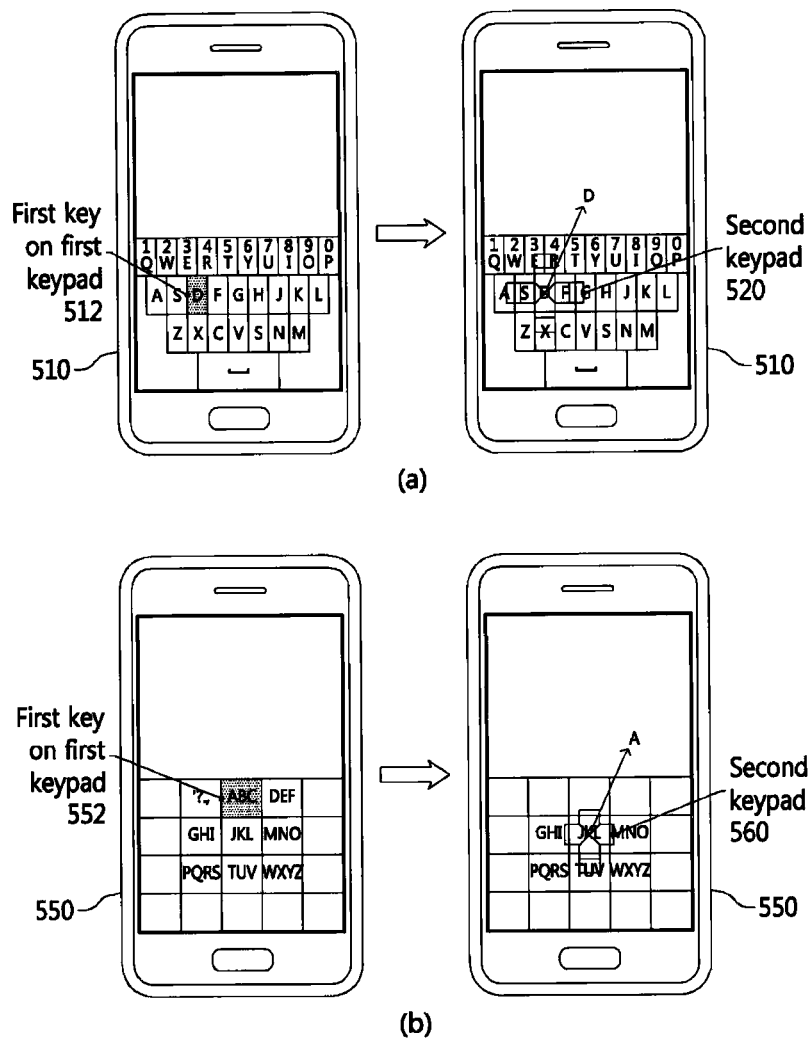
FIG. 5 is an exemplary view showing forms of second keypads visibly created on a first keypad according to an embodiment of the present invention.
Figure 6:
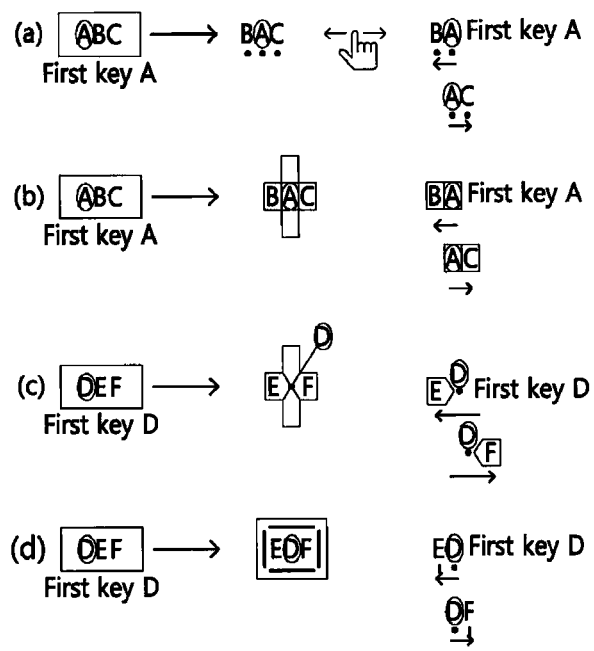
FIG. 6 is an exemplary view showing forms of character keys created by a second keypad creation unit according to an embodiment of the present invention.
Figure 7:
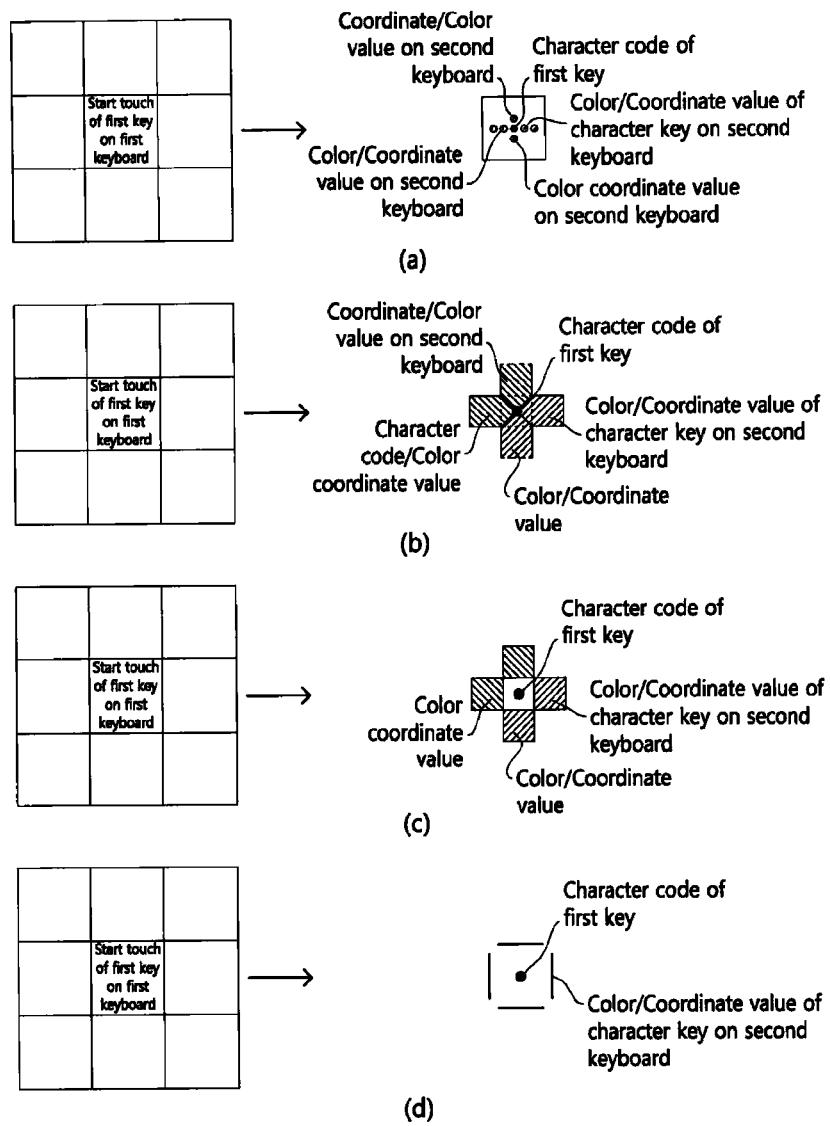
FIG. 7 is an exemplary view showing forms of character keys and assignment of codes on a second keypad according to an embodiment of the present invention.

FIG. 1 is a block diagram schematically showing the configuration of a character input device according to an embodiment of the present invention, FIG. 2 is an exemplary view showing the structure of a first keypad information database according to an embodiment of the present invention, FIG. 3 is an exemplary view showing the structure of a second keypad information database according to an embodiment of the present invention, FIG. 4 is an exemplary view showing a first keypad according to an embodiment of the present invention, FIG. 5 is an exemplary view showing forms of second keypads visibly created on a first keypad according to an embodiment of the present invention, FIG. 6 is an exemplary view showing forms of character keys created by a second keypad creation unit according to an embodiment of the present invention, and FIG. 7 is an exemplary view showing forms of character keys and assignment of codes on a second keypad according to an embodiment of the present invention.

Referring to FIG. 1, a character input apparatus 100 includes a touch screen 110, a storage unit 120, a database 130, a first keypad creation unit 140, a first key touch recognition unit 150, a second keypad creation unit 160 and a second key touch recognition unit 170.

The touch screen 110 includes a display unit 112 and a touch panel 114. The display unit 112 displays a state of the character input apparatus 100. At this point, the display unit 112 may be implemented in a Liquid Crystal Display (LCD) or the like.

The touch panel 114 is mounted on the display unit 112 and provided with a touch sense unit (not shown) and a signal conversion unit (not shown). The touch sense unit is an element for sensing whether or not a touch device touches the touch screen and senses generation of touch by detecting changes of, for example, resistance, capacitance or the like. Here the touch device may include a hand of a user, a touch pen, a stylus pen, a mouse and the like. The signal conversion unit converts changes of physical quantity into a touch signal. Although the touch sense unit may be configured of a touch sensor of a capacitive overlay, a resistive overlay, an infrared beam or the like or configured of a pressure sensor, it is not limited thereto and may include all kinds of sensors capable of sensing touch or pressure of an object.

The touch screen 110 may also include an apparatus having an interface capable of character input only through a touch action on a specific character key, without directly touching the character key.

The storage unit 120 performs a function of storing programs and data needed for operation of the character input apparatus 100.

The database 130 includes a first keypad information database 132 and a second keypad information database 134.

The first keypad information database 132 stores a coordinate value according to the form and size of each of character keys configuring the first keypad, a center point coordinate value or a center point color value of each of the character keys arranged on the first keypad, a character code and a character label corresponding to the center point coordinate value or the center point color value, and the like. Here, a form of a character key configuring the first keypad may be a rectangle, a circle, a straight line, a dot, a character, a color or the like, and the form or size of a character key may be arbitrarily determined and visibly or invisibly expressed. A character key of a color form is configured in a photo, a picture or the like.

The first keypad information database 132 stores information on the first keypad in the form of a character key layout table as shown in FIG. 2. Referring to FIG. 2, a center point coordinate value "(30,40)" of a first key arranged on the first keypad, a center point color value (color code) "red(02)" of the first key, a character code "0041" of the first key, a character label "A" of the first key and the like are stored in the first keypad information database 132.

Information on the first keypad stored in the first keypad information database 132 is provided to the first keypad creation unit 140 in the case of character input mode.

The second keypad information database 134 stores a coordinate value according to the form and size of second keypad corresponding to each of the keys arranged on the first keypad, a center point coordinate value or a center point color value of each of the character keys arranged on the second keypad, a character code and character label on the second keypad corresponding to the center point coordinate value or the center point color value, a character code and a character label on the second keypad corresponding to the character code of the first key and a touch move direction and the like. Here, a form of a character key configuring the second keypad may be a rectangle, a circle, a straight line, a dot, a character, a color or the like, and the form or size of a character key may be arbitrarily determined and visibly or invisibly expressed. The coordinate value of a character key arranged on the second keypad may be expressed as a single coordinate value in the case of a character key of a dot form and as a plurality of coordinate values in the case of a character key having an area formed as a straight line, a rectangle, a polygon or a circle. For example, the coordinate value may be previously determined as one or more coordinate values in the case of a character key of a dot form, coordinate values of about three points (three pixels) in the case of a character key of a straight line form, or less than the number of coordinate values expressing an area in the case of a character key having an area. In addition, if a representative coordinate value of a character key is selected among the plurality of coordinate values allocated to each character key as a center point coordinate value and the center point coordinate value is defined in the second keypad information database 134 in advance, the center point coordinate value of a corresponding character key is obtained when a specific character key is touched.

Since the second keypad information database 134 stores information on the second keypad for each of the keys arranged on the first keypad and a corresponding character code is assigned to a character key arranged on the second keypad, the second keypad can input character keys.

The second keypad information database 134 stores information on the second keypad in the form of a character key layout table as shown in FIG. 3.

FIG. 3a shows a case of storing a center point coordinate value of a character key arranged on the second keypad and a character code and a character label on the second keypad corresponding to the center point coordinate value. In this case, a center point coordinate value "(40, 50)" of a character key arranged on the second keypad, character code "0042" of the character key, a character label "B" of the character key and the like are stored in the second keypad information database 134 as information on the second keypad.

FIG. 3b shows a case of storing a center point color value of a character key arranged on the second keypad and a character code and a character label corresponding to the center point color value. In this case, a center point color value "Red" of a character key arranged on the second keypad, a center point coordinate value "(50, 50)" of the character key, a character code "0043" of the character key, a character label "C" of the character key and the like are stored in the second keypad information database 134 as information on the second keypad.

FIG. 3c shows a case of storing a character code and a character label on the second keypad corresponding to a character code of a first key and a touch move direction. In this case, a code value "0043" of the first key, a touch move direction "right", a character code "0044" of a character key arranged on the second keypad, a character label "F" of the character key and the like are stored in the second keypad information database 134 as information on the second keypad. Here, a value of the character code of a character key arranged on the second keypad may vary according to combination of the code value of the first key and the touch move direction.

The character key layout table of the second keypad as shown in FIG. 3 is stored in the system as a character array and character code format file of the second keypad using a program. Character keys belonging to the second keypad may be used by previously marking together with the first key on the first keypad. That is, a predetermined number of character keys around the first key may be displayed on the second keypad, or a predetermined number of character keys highly probable to be used may be displayed on the second keypad based on a character key use pattern.

In the case of character input mode, the first keypad creation unit 140 displays the first keypad configured of at least one or more character keys on the touch screen 110. At this point, the first keypad creation unit 140 creates the first keypad configured of character keys having at least one of the forms including a dot, a straight line, a curved line, a polygon, a circle and a color.

The first keypad created by the first keypad creation unit 140 may be set in advance, and it may be a keypad having a general QWERTY type key array as shown in FIG. 4a, a character keypad based on twelve keys as shown in FIG. 4b, or a keypad having its own structure as shown in FIG. 4c. That is, the first keypad or the second keypad may be configured in the form of allocating and arranging character keys of each country on a standard key array of a computer such as QWERTY or may be configured in the form of allocating character keys of each country to be overlapped with a key on a keypad having a key array of a small number of keys. In addition, the first keypad or the second keypad may be a keypad configured of character keys designed in a unique structure such as a color picture or the like. In addition, the first keypad or the second keypad may be implemented in a keypad configured of a subset of character keys in the rows and columns of a keyboard having a character array the same as that of a computer keyboard, a keypad configured of some character keys of the characters on a standard 10-key array of a telephone, or a keypad configured of character keys configured in a unique structure such as a color or figure type keypad.

The first keypad creation unit 140 performs a function of providing the first keypad to the display unit 112 of the character input apparatus 100 in response to a request from a user.

If touch of the first key is sensed on the first keypad, the first key touch recognition unit 150 acquires a character code corresponding to the value of the first key from the first keypad information database 132 and calls the second key touch recognition unit 160. Here, the first key is a key initially input by touch among the character keys on the first keypad, and it may perform a function of starting creation and display of the second keypad when the first key is input.

The first key touch recognition unit 150 acquires the center point coordinate value or the center point color value of the initially touched first key among the character keys arranged on the first keypad. Since a touch panel is basically provided with pixel data, the first touch key recognition unit 150 may acquire the center point coordinate value (X, Y) of the key at the touch start point. In addition, if the first keypad is created on a specific picture, the first key touch recognition unit 150 may also acquire the center point color value of the key at the touch start point.

If the center point coordinate value or the center point color value of the initially touched first key is acquired, the first key touch recognition unit 150 may acquire a character code corresponding to the center point coordinate value or the center point color value by searching the first keypad information database 132. Since character codes corresponding to center point coordinate values or center point color values of the character keys arranged on the first keypad are stored in the first keypad information database 132, the first key touch recognition unit 150 may acquire a character code of the first key from the first keypad information database 132.

In response to the call of the first key touch recognition unit 150, the second keypad creation unit 160 creates a second keypad including character keys in the neighborhood of the first key and virtually display the second keypad on the touch screen 110. In addition, the second keypad creation unit 160 may create a second keypad including a predetermined number of character keys highly probable to be used together with the first key and virtually display the second keypad on the touch screen 110.

The second keypad creation unit 160 virtually create and display a second keypad arranging character keys which can be input, in at least one of the upward, downward, leftward, rightward and diagonal directions. At this point, the second keypad creation unit 160 may visibly or invisibly create the virtual second keypad inside or outside of the first key of the first keypad. In addition, the second keypad is created around the first key, and it is sufficient if the position of displaying the second keypad is inside the touch screen, and the second keypad does not need to be necessarily displayed around the touch point where a first key touch input is received.

A case of creating and displaying a second keypad on the first keypad by the second keypad creation unit 160 will be described with reference to FIG. 5. First, FIG. 5a is a view showing a case of displaying a second keypad 520 on a first keypad 510 based on an English QWERTY keyboard. Referring to FIG. 5a, if a user inputs 'D' as a first key 512, the second keypad creation unit 160 creates and displays the second keypad 520 on the first keypad 510 around the center point of the first key 512 as soon as the first key is input. At this point, character keys arranged up and down and left and right of 'D' are displayed on the second keypad 520.

Next, FIG. 5b is a view showing a case of displaying a second keypad 560 on a first keypad 550 based on a character array ABC of a telephone keypad. Referring to FIG. 5b, if a user inputs 'A' as a first key 552, the second keypad creation unit 160 creates a second keypad 560 around the center point of the first key 552 as soon as the first key is input and displays the second keypad 560 on the first keypad 550. At this point, character keys arranged together with 'A' are displayed on the second keypad 560.

The second keypad creation unit 160 creates a layout of the second keypad in the form of various character keys. For example, the second keypad creation unit 160 may configure the second keypad by expressing a character key as a polygonal character key, a dot, a straight line, a curved line, a circle, a colored figure or the like having an area the same as or smaller than that of a key of the first keypad. At this point, the character key boundaries on the first keypad may be different from or the same as the character key boundaries on the second keypad.

The character keys of the second keypad created in a variety of forms by the second keypad creation unit 160 will be described with reference to FIG. 6.

FIG. 6a is a view expressing character keys of the second keypad by the unit of a dot (corresponding to a pixel on a touch panel) and displaying the second keypad expressed as dot form character keys around the first key on the first keypad. A coordinate value or a color value on a second keyboard (→ the second keypad) is assigned to each of the dots displayed around the first key.

FIG. 6b is a view expressing character keys of the second keypad as polygonal small keys around the center point of the first key and displaying the second keypad expressed as polygonal small keys around the first key on the first keypad. A coordinate value or a color value on a second keyboard (→ the second keypad) is assigned to each of the polygonal keys displayed around the first key.

FIG. 6c is a view expressing character keys of the second keypad as rectangular small keys and displaying the second keypad expressed as rectangular small keys around the first key on the first keypad. A coordinate value or a color value on a second keyboard (→ the second keypad) is assigned to each of the rectangular keys displayed around the first key.

FIG. 6d is a view expressing character keys of the second keypad as small keys of a straight line and displaying the second keypad expressed as small keys of a straight line around the first key on the first keypad. A coordinate value or a color value on a second keyboard (→ the second keypad) is assigned to each of the straight lines displayed around the first key.

As described above with reference to FIG. 6, a character key of the first keypad or the second keypad may be configured in the form of a rectangle, a circle, a straight line, a dot, a character, a color or the like, and a form or a size of a character key may be arbitrarily determined and visibly or invisibly expressed. In addition, a fingering distance of a key touch can be reduced as the size or the number of the character keys on the second keypad is reduced to be smaller than the size or the number of the character keys on the first keypad, and the distance between character keys can be optimized. The character key boundaries on the first keypad may be different from or the same as the character key boundaries on the second keypad.

Since the character keys of the second keypad have a variety of forms, the second keypad creation unit 160 implements the character keys of the second keypad by selecting a form from the character keys of various forms, and the implemented virtual second keypad is visibly or invisibly provided on the first keypad. In addition, a unique character code is assigned to each character key of the second keypad, and the character code is used by the second key touch recognition unit 170 on the second keypad. That is, if touch of a first key begins on the first keypad, character keys of the second keypad are created around the center point of the first key, and it becomes a state capable of character input.

The forms of character keys and assignment of character codes on the second keypad will be described with reference to FIG. 7. FIG. 7a is a view showing character keys of the second keypad configured in a dot form around the first key A of the first keypad, and a unique character code such as B or C is assigned to each dot formed key. FIG. 7b is a view showing character keys of the second keypad configured in a rectangular form around the first key A of the first keypad, and a unique character code such as B or C is assigned to each of the rectangular keys. FIG. 7c is a view showing character keys of the second keypad configured in a polygonal form around the center point of the first key D of the first keypad, and a unique character code such as E or F is assigned to each of the polygonal keys. FIG. 7d is a view showing character keys of the second keypad configured in a straight line form around the center point of the first key D of the first keypad, and a unique character code such as E or F is assigned to each of the keys formed in a straight line. Here, the center point of a character key arranged on the first keypad or the second keypad has a specific coordinate value within the character key assigned according to the form of the character key on the first keypad or the second keypad, and it is stored in the database 130.

The second key creation unit 160 may provide an interface capable of easily recognizing a character key which can be input on the second keypad by displaying a figure of the second keypad having a configuration the same as that of the second keypad in a character input window, as soon as creating the second keypad on the first keypad. At this point, the second keypad may be provided in a configuration independent from the first keypad, in which boundaries of the character keys on the second keypad are different from boundaries of the character keys on the first keypad, and a character code value assigned to each of the characters of the second keypad is also different from the those of the first keypad.

If a touch move action is sensed on the second keypad, the second key touch recognition unit 170 acquires a character corresponding to the touch move action from the second keypad information database 134 and displays the character on the touch screen 110. Here, the touch move action includes dragging, flicking, sliding and the like and can be an action continued from a first key touch action. Character input of a user on the second keypad virtually created on the first keypad is accomplished by a touch move action of the user, and if the touch action is completed without a touch move action, a character corresponding to the character code of the first key is output in the character input window of the touch screen 110.

Assignment of an input character key according to a touch move action of a user on the second keypad may vary according to the method of implementing a character key configuring the second keypad. A character key configuring the second keypad can be implemented in an arbitrary form and size, such as a rectangle, a circle, a straight line, a dot, a character, a color or the like. A touch move direction of a user on the second keypad is the upward, downward, leftward, rightward or diagonal direction from inside or outside of the first key, and it can be any direction in which a character key of the second keypad is set.

The second key touch recognition unit 170 displays a character on the touch screen 110 using at least one of the coordinate value, the color value and the touch move direction information according to the touch move action. Hereinafter, a case of displaying a character using a coordinate value or a color value according to a touch move action and a case of displaying a character using touch move direction information will be described separately.

First, a case of displaying a character using a coordinate value or a color value according to a touch move action will be described. In this case, the second key touch recognition unit 170 acquires a coordinate value or a color value according to a touch move action on the second keypad, extracts a character code corresponding to the acquired coordinate value or color value from the second keypad information database 134, and displays a character corresponding to the extracted character code on the touch screen 110.

Finally, a case of displaying a character using touch move direction information will be described. In this case, the second key touch recognition unit 170 acquires a coordinate value according to a touch move action on the second keypad, detects touch move direction information through an operation on the center point coordinate value of the first key and the coordinate value according to the touch move action, extracts a character code corresponding to a combination of the character code of the first key and the touch move direction information by searching the second keypad information database 134, and displays a character corresponding to the extracted character code on the touch screen 110. At this point, the second key touch recognition unit 170 detects the touch move direction information through a subtraction operation on the center point coordinate value of the first key and the coordinate value of the touch end point. For example, when the coordinate value of the touch end point is (X2, Y2) and the center point coordinate value of the first key, which is the touch start point, is (X1, Y1), the second key touch recognition unit 170 calculates X2−X1=DX, Y2−Y1=DY. The touch move direction information is created as move left if DX is a negative value as a result of the calculation, move right if DX is a positive value, move downward if DY is a negative value, and move upward if DY is a positive value. At this point, if the DX and DY values are the same, any one of them may have priority over the other. Then, the second key touch recognition unit 170 may combine the touch move direction information with the character code of the first key, extract a character code on the second keypad corresponding to a set of the Combined character code and touch move direction information from the second keypad information database 134, and display a character corresponding to the extracted character code.

The second key touch recognition unit 170 functions only in a corresponding input mode as far as a key touch is not released in the input mode of the second keypad.

Since a touch movement can be made in the upward, downward, leftward, rightward or diagonal direction from the first key of the user while the character key input mode of the second keypad is maintained, the second key touch recognition unit 170 may detect and recognize a coordinate value of a specific position having a code value when a touched position is moved.

The character input apparatus 100 configured as described above may input a character in six combinations based on the center point of the first key, information on the character keys on the second keypad and a touch move action. Specifically, the character input apparatus 100 may input a character using at least one of (1) a combination of the center point coordinate value of the first key and a coordinate value of a character key on the second keypad, (2) a combination of the center point coordinate value of the first key and a color value of a character key on the second keypad, (3) a combination of the center point color value of the first key and a coordinate value of a character key on the second keypad, (4) a combination of the center point color value of the first key and a color value of a character key on the second keypad, (5) a combination of the center point coordinate value of the first key and touch move direction information on the second keypad, and (6) a combination of the center point color value of the first key and touch move direction information on the second keypad.

The character input apparatus 100 as described above may be applied to any user device provided with a touch screen. For example, the character input apparatus 100 may be applied to various devices such as a notebook computer, a mobile communication terminal, a smart phone, a Portable Media Player (PMP), a Personal Digital Assistant (PDA), a tablet PC, a set-top box, a smart TV and the like.

Figure 8:
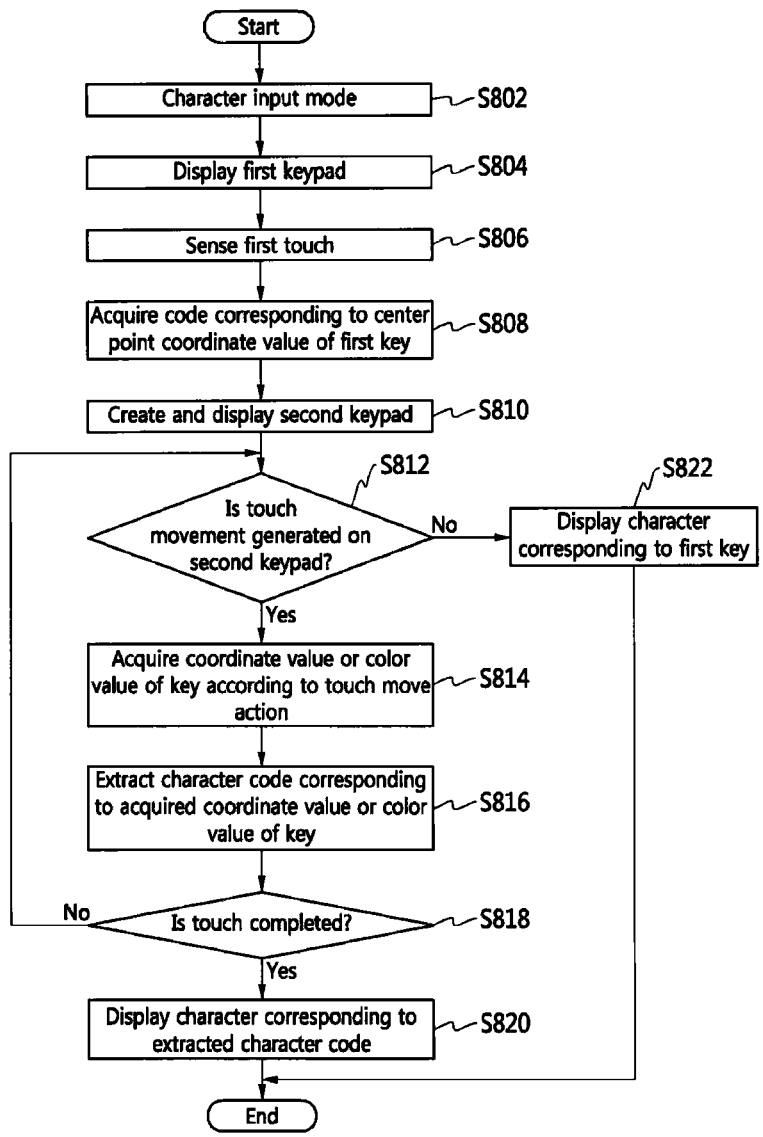
FIGS. 8 to 10 are flowcharts illustrating a method of inputting a character in a character input apparatus according to an embodiment of the present invention.

FIG. 8 is a flowchart illustrating a method of inputting a character in a character input apparatus according to an embodiment of the present invention.

Referring to FIG. 8, if a character input mode is executed (step S802), the character input apparatus displays a first keypad configured of one or more character keys on a touch screen (step S804).

If a first key touch is sensed on the first keypad (step S806), the character input apparatus acquires a character code corresponding to the center point coordinate value of the first key (step S808). That is, if touch of an initially touched first key is sensed, the character input apparatus acquires the center point coordinate value of the first key and acquires a character code corresponding to the center point coordinate value of the first key by searching a first keypad information database provided in advance.

Then, the character input apparatus creates a second keypad including character keys in the neighborhood of the first key and displays the second keypad on the touch screen (step S810) and determines whether or not a touch move action is sensed on the second keypad (step S812). At this point, the character input apparatus displays the second keypad on the first keypad and senses a touch move action such as dragging, flicking, sliding or the like.

If a touch move action is sensed on the second keypad as a result of the determination at step S812, the character input apparatus acquires a center point coordinate value or a center point color value of a character key according to the touch move action (Step S814) and extracts a character code corresponding to the acquired center point coordinate value or center point color value by searching a second keypad information database (step S816).

Then, if the touch movement is completed (step S818), the character input apparatus displays a character corresponding to the character code extracted at step S816 on the touch screen (step S820).

If a touch move action is not sensed on the second keypad as a result of the determination at step S812, the character input apparatus displays a character corresponding to the character code acquired at step 3808 on the touch screen (step S822).

Hereinafter, an embodiment of a case in which the center point coordinate value of the first key is (33, 33) and a code value of character is previously assigned to a coordinate value (44, 44) will be described.

In this case, if the touch movement is completed at a coordinate value (44, 44), the character input apparatus acquires a code value of character 'a' corresponding to the coordinate value (44, 44) by searching the second keypad information database and displays a character corresponding to the code value on the touch screen.

Through the procedures described above, input of a character is completed by one touch input.

Figure 9:
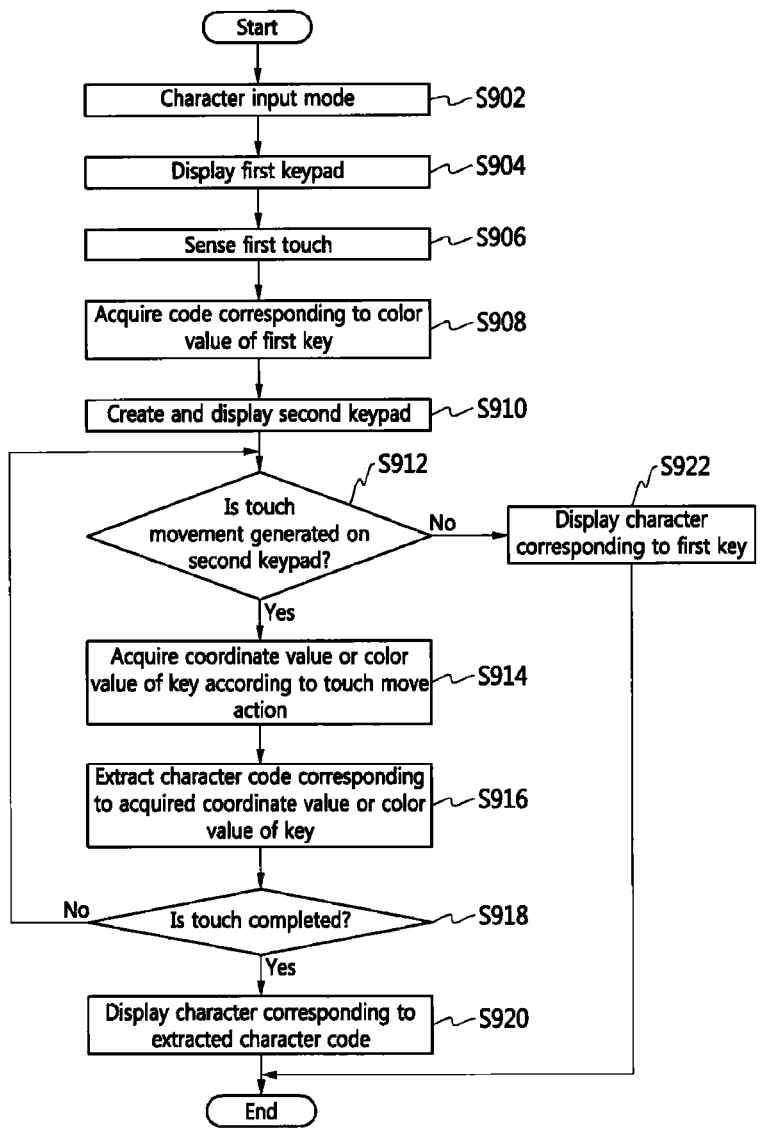

FIG. 9 is a flowchart illustrating a method of inputting a character in a character input apparatus according to another embodiment of the present invention.

Referring to FIG. 9, if a character input mode is executed (step S902), the character input apparatus displays a first keypad configured of one or more character keys on a touch screen (step 3904).

If an initial first key touch is sensed (step S906), the character input apparatus acquires a center point color value of the first key and acquires a character code corresponding to the center point color value of the first key by searching the first keypad information database provided in advance.

Then, the character input apparatus creates a second keypad including character keys in the neighborhood of the first key and displays the second keypad on the touch screen (step S910) and senses a touch move action on the second keypad (step S912). At this point, the character input apparatus displays the second keypad on the first keypad and senses a touch move action such as dragging, flicking, sliding or the like.

If a touch move action is sensed on the second keypad as a result of the determination at step S912, the character input apparatus acquires a coordinate value or a color value according to the touch move action (step S914) and extracts a character code corresponding to the acquired coordinate value or color value (step S916).

Then, if the touch movement is completed (step S918), the character input apparatus displays a character corresponding to the character code extracted at step S916 on the touch screen (step S920).

If a touch move action is not sensed on the second keypad as a result of the determination at step S912, the character input apparatus displays a character corresponding to the character code acquired at step S908 on the touch screen (step S922).

As described above, the character input apparatus may input a character key on the second keypad by assigning a character code to a color after classifying and defining the character keys on the first keypad or the second keypad by color and individually expressing the characters in color. That is, if character keys of the second keypad existing at a position to which a touch movement can be applied from the center point of the first key are assigned with a distinguishable color such as red, blue, yellow, purple, greed or the like, these character keys can be distinguished by the value of a color. In addition, first keys on the first keypad may also be expressed in colors described above.

Accordingly, if a color of a touch start point, i.e., the center point coordinates of the first key, and a color of the coordinates of the move end point are specified, the character input apparatus may acquire, output and display a character code value assigned to the color of a corresponding point.

The character input apparatus may input or output a character using a character key expressed only in color without a special form.

If a character key is implemented by assigning a color value as shown in FIG. 9, a keyboard of a special form which sets a character code to a specific color in a sheet of picture or an image can be designed and configured, and it can be utilized as a character input keyboard appropriate to a special purpose. For example, as a character input keyboard of a special purpose, it can be utilized as an ID or PW (password) input keyboard used for a locking mechanism of a smart phone.

Figure 10:
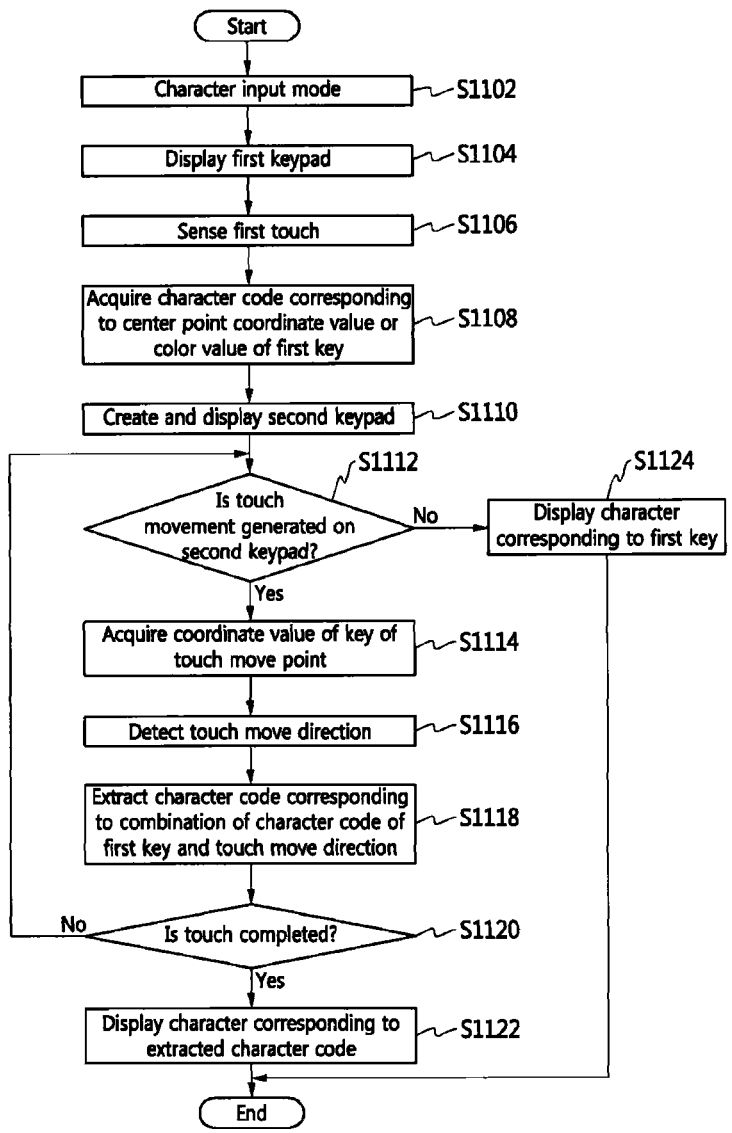

FIG. 10 is a flowchart illustrating a method of inputting a character in a character input apparatus according to still another embodiment of the present invention.

Referring to FIG. 10, if a character input mode is executed (step S1102), the character input apparatus displays a first keypad configured of one or more character keys on a touch screen (step S1104).

If a first key touch is sensed on the first keypad (step S1106), the character input apparatus acquires a character code corresponding to the center point coordinate value or the center point color value of the first key (step S1108) and acquires a character code corresponding to the center point coordinate value or the center point color value of the first key by searching the first keypad information database provided in advance.

Then, the character input apparatus creates a second keypad including character keys in the neighborhood of the first key and displays the second keypad on the touch screen (step S1110) and senses a touch move action on the second keypad (step S1112).

If a touch move action is sensed on the second keypad, the character input apparatus acquires a coordinate value of the touch move point (step S1114) and detects a touch move direction using the acquired coordinate value (step S1116). At this point, the character input apparatus calculates X2−X1=DX, Y2−Y1=DY using the coordinate value (X2, Y2) of the touch end point and the center point coordinate value (X1, Y1) of the first key, which is the touch start point. The touch move direction information is created as move left if DX is a negative value as a result of the calculation, move right if DX is a positive value, move downward if DY is a negative value, and move upward if DY is a positive value. At this point, if DX and DY values are the same, the DX value has priority. That is, the horizontal and vertical values are the same, the horizontal direction has priority.

If step S1116 is performed, the character input apparatus extracts a character code corresponding to a combination of the character code of the first key and the touch move direction information from the second keypad information database (step S1118). Here, a combination value of the character code of the first key and the touch move direction information may be configured in the form of a set of (character code of first key, touch move direction information). For example, if the character code of the first key is 'A' and the touch move direction information is Right, it can be configured in the form of a set like (A, Right). In this case, the character code of the first key, the coordinate value or the color value of the center point of the first key, touch move direction information, a character code and a character label on the second keypad corresponding to the character code of the first key and the touch move direction information and the like are stored in the second keypad information database as shown in FIG. 3c.

If the touch movement is completed (step S1120) after step S1118 is performed, the character input apparatus displays a character corresponding to the character code extracted at step S1118 on the touch screen (step S1122).

If a touch move action is not sensed on the second keypad as a result of the determination at step S1112, the character input apparatus displays a character corresponding to the first key of the first keypad (step S1224).

As described above, the character input apparatus may input a character using touch move direction information. That is, using the coordinate value and the color value of the center point of the first key on the first keypad, the character input apparatus may acquire a corresponding character code from the first keypad information database, detect a touch move direction according to an upward, downward, leftward or rightward touch move action, and then acquire a character code corresponding to a combination of the character code of the first key and the upward, downward, leftward or rightward touch move direction information from the second keypad information database and display a character corresponding to the acquired character code.

Figure 11:
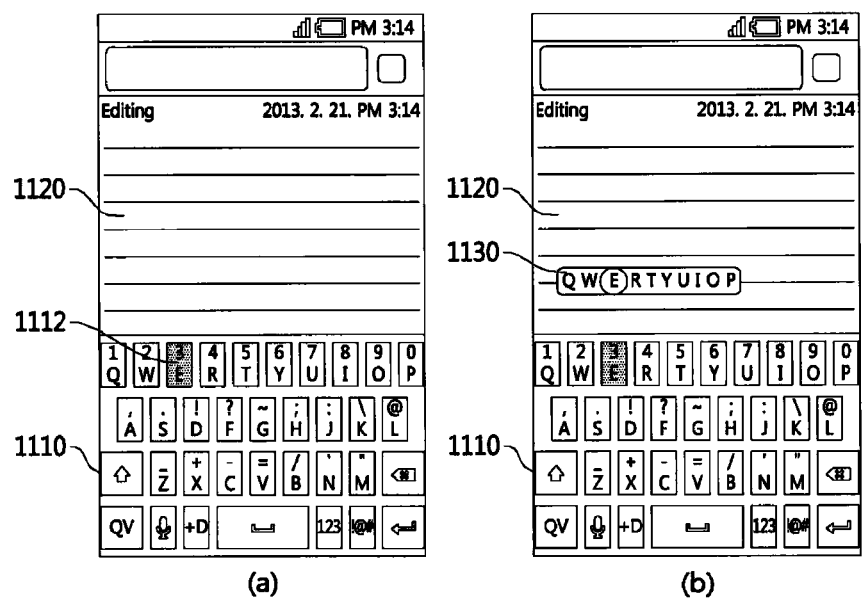
FIGS. 11 to 14 are exemplary views showing screens for illustrating a method of inputting a character according to an embodiment of the present invention.

FIG. 11 is an exemplary view showing screens for illustrating a method of inputting a character using a QWERTY keypad as a first keypad according to an embodiment of the present invention.

Referring to FIG. 11, if 'E' 1112, which is the first key, is touched on the first keypad 1110 while a QWERTY keypad is created as a first keypad 1110 as shown in FIG. 11a, the character input apparatus informs that it is the character key input mode of the second keypad and displays a second keypad 1130 including character keys in the neighborhood of the first key in a character input window area 1120 as shown in FIG. 11b.

If the user performs a touch move action on the second keypad 1130 and releases the touch on a desired character key, the character input apparatus displays a corresponding character in the character input window area 1120.

Figure 12:
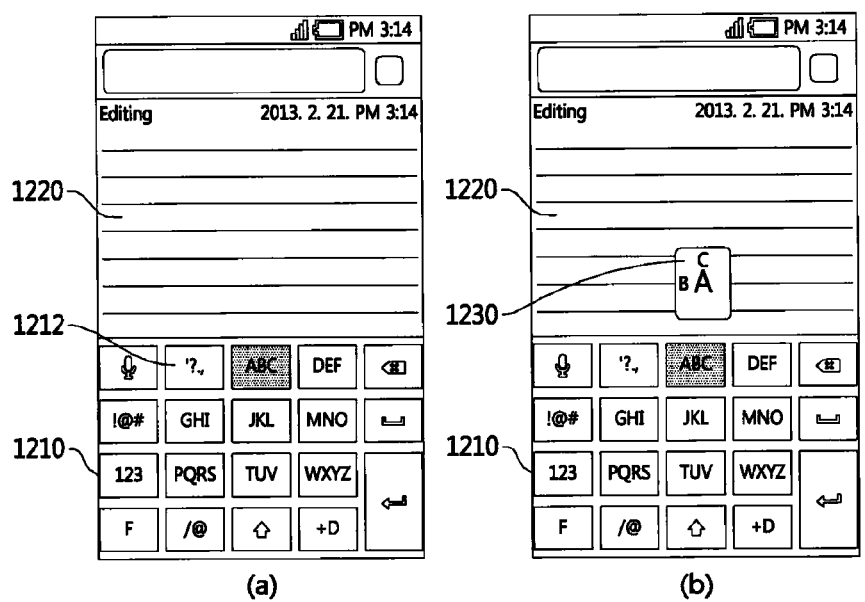

FIG. 12 is an exemplary view showing screens for illustrating a method of inputting a character using a 12-key alphabet keypad as a first keypad according to an embodiment of the present invention.

Referring to FIG. 12, if the 'ABC' key 1212, which is the first key, is touched on the first keypad 1210 while a 12-key alphabet keypad is created as a first keypad 1210 as shown in FIG. 12a, the character input apparatus informs that it is the character key input mode of the second keypad and displays a second keypad 1230 including character keys included in the first key 1212 in a character input window area 1220 as shown in FIG. 12b.

If the user performs a touch more action on the second keypad 1230 and releases the touch on a desired character key, the character input apparatus displays a corresponding character in the character input window area 1220.

Figure 13:
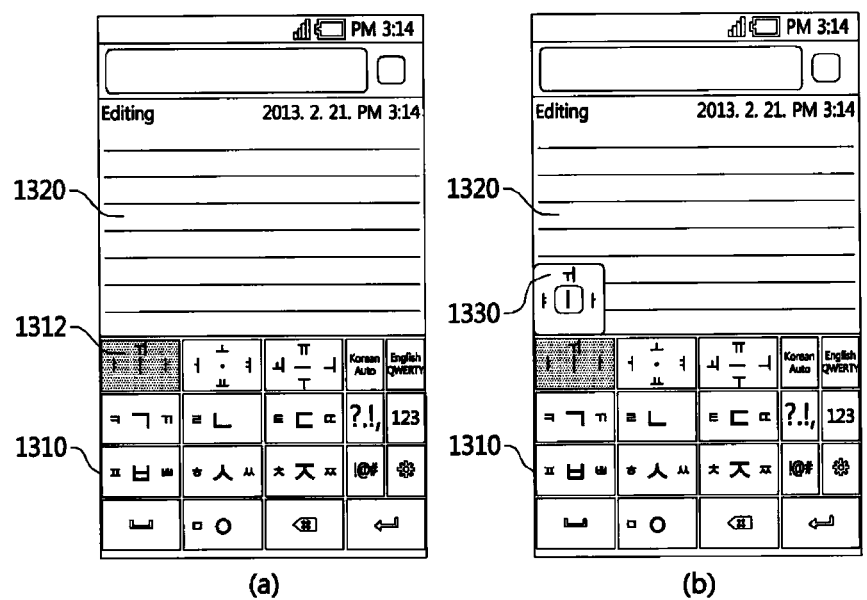

FIG. 13 is an exemplary view showing screens for illustrating a method of inputting a character using a keypad arranging Korean consonants and vowels as a first keypad according to an embodiment of the present invention.

Referring to FIG. 13, if the 'l' (ㅏ, ㅑ, ㅟ) key 1312 is touched as a first key on the first keypad 1310 as shown in FIG. 13a, the character input apparatus informs that it is the character key input mode of the second keypad and displays a second keypad 1330 including character keys included in the first key 1312 in a character input window area 1320 as shown in FIG. 13b.

If the user moves the touch in the direction to the point of key 'ㅏ', the character input apparatus acquires a coordinate value of key 'ㅏ', acquires a character code corresponding to the acquired coordinate value and displays the character 'ㅏ' corresponding to the acquired character code in the character input window area 1320 if the user releases the touch at the same point.

Figure 14:
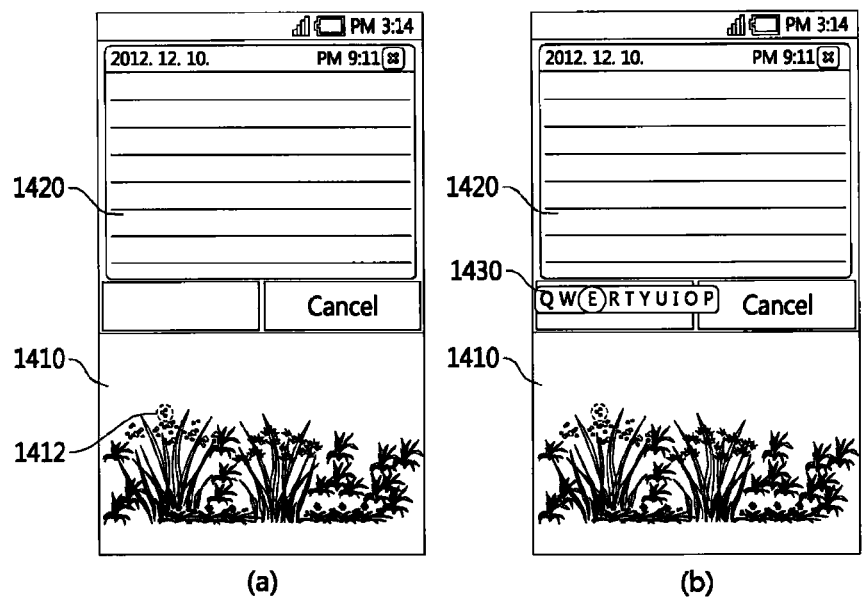

FIG. 14 is an exemplary view showing screens for illustrating a method of inputting a character using a picture as a first keypad according to an embodiment of the present invention.

Referring to FIG. 14, if a sunflower picture as shown in FIG. 14a is used as a first keypad 1410, character keys are assigned on the first keypad 1410 according to colors or positions.

If the user touches area 'A' 1412 on the first keypad 1410, the character input apparatus informs that it is the character key input mode of the second keypad and displays a second keypad 1430 including character keys assigned to the area 'A' 1412 in a character input window area 1420 as shown in FIG. 14b.

Then, if the user performs a touch move action on the second keypad 1430 and releases the touch on a desired character key, the character input apparatus displays a corresponding character in the character input window area 1420.

This corresponds to a case in which the second keypad 1430 and the character keys are invisibly created on the first keypad 1410.

According to the present invention, characters can be input rapidly and conveniently and, furthermore, error input can be reduced by doubly providing keypads in a touch or non-touch action type character input apparatus of various materials and forms.

In addition, a character can be input more correctly and flexibly by virtually providing a second keypad, on which characters that can be input by touch movement of a user are displayed, when a touch start of a first key is sensed on a first keypad which is provided basically.

In addition, since nine or more characters can be input through a first key touched on the first keypad when the keys of the second keypad virtually displayed on the first keypad are arranged in upward, downward, leftward, rightward and diagonal directions, a user can input a character more conveniently and correctly.

In addition, a new user experience can be provided by providing a character input apparatus of various forms invisible to other people, such as an idle screen of a smart phone, a background picture of an application or web, a figure and the like.

In addition, efficiency of character input can be improved by reducing a fingering distance required for character input in the character input environments of various users, improving correctness of character key touch and minimizing movements of a hand.

In addition, a plurality of characters can be input through a touch start character key without pressing keys several times in inputting characters using a touch screen.

In addition, speed of character input can be improved by displaying a complete character on a screen through one touch and touch move action on a touch-type keypad.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

Embodiments of the subject matter and the functional operations described in this specification can be implemented in digital electronic circuitry, or in computer software, firmware, or hardware including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by or to control the operation of a data processing apparatus.

The tangible program carrier can be a computer readable medium, which can be a machine-readable storage device, a machine-readable storage substrate, a memory device, a composition of matter effecting a machine-readable propagated signal, or any combination thereof.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or any combination thereof.

While this specification contains many specifics, these should not be construed as limitations on the scope of an invention that is claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing can be advantageous. Moreover, the separation of various system components in the embodiments described above should not be understood as requiring such separation in all embodiments and it should be understood that the described program components and systems can generally be integrated together in a single software product or packaged into multiple software products.

As described above, this specification is not intended to limit the present invention to the presented specific terms. While the present invention has been described in detail with reference to the particular illustrative embodiments, those skilled in the art can alter, change or modify the embodiments without departing from the scope and spirit of the present invention. The scope of the present invention is defined by the accompanying claims, rather than the above detailed description, and the meaning and scope of the claims and all changes and modifications derived from equivalents thereof should be interpreted as being included in the scope of the present invention.

The invention claimed is:

1. A character input apparatus comprising:
a touch screen;
a first keypad information database for storing information on a first keypad;
a second keypad information database for storing information on a second keypad;
a first keypad creation unit for di splaying the first keypad configured of at least one or more character keys on the touch screen in a case of character input mode;
a first key touch recognition unit for acquiring, if touch of a first key is sensed on the first keypad, a character code corresponding to a value of the first key from the first keypad information database and calling a second keypad creation unit;
the second keypad creation unit for creating a second keypad including character keys related to the first key and displaying the second keypad on, the touch screen, in response to the call of the first key touch recognition unit; and
a second key touch recognition unit for acquiring, if a touch move action is sensed on the second keypad, a character corresponding to the touch move action from the second keypad information database and displaying the character on the touch screen,
wherein the first keypad information database stores at least one of a coordinate value according to a form and a size of a character key configuring the first keypad, a center point coordinate value or a center point color value of the character key arranged on the first keypad, and a character code and a character label corresponding to the center point coordinate value or the center point color value.

2. A character input apparatus comprising:
a touch screen;
a first keypad information database for storing information on a first keypad;
a second keypad information database for storing information on a second keypad;
a first keypad creation unit for displaying the first keypad configured of at least one or more character keys on the touch screen in a case of character input mode;
a first key touch recognition unit for acquiring, if touch of a first key is sensed on the first keypad, a character code corresponding to a value of the first key from the first keypad information database and calling a second keypad creation unit;

the second keypad creation unit for creating a second keypad including character keys related to the first key and displaying the second keypad on the touch screen, in response to the call of the first key touch recognition unit; and a second key touch recognition unit for acquiring, if a touch move action is sensed on the second keypad, a character corresponding to the touch move action from the second keypad information database and displaying the character on the touch screen, wherein if touch of the first key is sensed on the first keypad, the first key touch recognition unit acquires a center point coordinate value or a center point color value corresponding to the first key and extracts a character code corresponding to the acquired center point coordinate value or center point color value from the first keypad information database.

3. A character input apparatus comprising:

a touch screen:

a first keypad information database for storing information on a first keypad;

a second keypad information database for storing information on a second keypad;

a first keypad creation unit for displaying the first keypad configured of at least one or more character keys on the touch screen in a case of character input mode;

a first key touch recognition unit for acquiring, if touch of a first key is sensed on the first keypad, a character code corresponding to a value of the first key from the first keypad information database and calling a second keypad creation unit, the second keypad creation unit for creating a second keypad including character keys related to the first key and displaying the second keypad on the touch screen, in response to the call of the first key touch recognition unit; and a second key touch recognition unit for acquiring, if a touch move action is sensed on the second keypad, a character corresponding to the touch move action from the second keypad information database and displaying the character on the touch screen, wherein the second keypad information database stores at least one of a coordinate value according to a form and a size of the second keypad corresponding to each key of the first keypad, a center point coordinate value or a center point color value of a character key arranged on the second keypad, a character code and a character label on the second keypad corresponding to the center point coordinate value or the center point color value, and a character code and a character label on the second keypad corresponding to a character code of the first keypad and touch move direction information.

4. The apparatus according to claim 1, wherein the second keypad creation unit creates a second keypad including a predetermined number of character keys arranged around the first key or creates a second keypad including a predetermined number of character keys frequently used together with the first key based on a character key use pattern.

5. The apparatus according to claim 1, wherein the second keypad, creation unit creates the second keypad in at least one of upward, downward, leftward, rightward and diagonal directions.

6. The apparatus according to claim 1, wherein the second keypad, creation unit visibly or invisibly creates the second keypad inside or outside of the first key of the first keypad.

7. A character input apparatus comprising:

a touch screen;

a first keypad information database for storing information on a first keypad;

a second keypad information database for storing information on a second keypad, a first keypad creation unit for displaying the first keypad configured of at least one or more character keys on the touch screen in a case of character input mode;

a first key touch recognition unit for acquiring, if touch of a first key is sensed on the first, keypad, a character code corresponding to a value of the first key from the first keypad, information database and calling a second keypad creation unit;

the second keypad creation unit for creating a second keypad including character keys related to the first key and displaying the second keypad on the touch screen, in response to the call of the first key touch recognition unit; and a second key touch recognition unit for acquiring, if a touch move action is sensed on the second keypad, a character corresponding to the touch move action from the second keypad information database and displaying the character on the touch screen, wherein the second key touch recognition unit acquires a coordinate value or a color value according to a touch move action on the second keypad, extracts a character code corresponding to the acquired coordinate value or color value from the second keypad information database, and displays a character corresponding to the extracted character code on the touch screen.

8. The apparatus according to claim 1, wherein the second key touch recognition unit acquires a coordinate value according to the touch, move action on the second keypad, detects touch move direction information through an operation on the center point coordinate value of the first key and the coordinate value according to the touch move action, extracts a character code corresponding to a combination of the character code of the first key and the touch move direction information by searching the second keypad information database, and displays a character corresponding to the extracted character code on the touch screen.

9. The apparatus according to claim 1, wherein if a touch, move action, is not sensed on the second keypad, the second key touch recognition unit displays a character corresponding to the character code corresponding to the value of the first key acquired by the first key touch recognition unit on the touch screen.

10. A method of inputting a character in a character input apparatus provided with a touch screen, the method comprising:

(a) a step of displaying a first keypad configured of at least one or more character keys on the touch screen in a case of character input mode;

(b) a step of acquiring, if touch of a first key is sensed on the first keypad, a character code corresponding to a value of the first key, creating a second keypad including character keys related to the first key and displaying the second keypad on the touch screen; and (c) a step of displaying, if a touch move action is sensed on the second keypad, a character corresponding to the touch move action on the touch screen, wherein the step (b) includes:

a step of acquiring, if touch of a first key is sensed on the first keypad, a center point coordinate value or a center point color value of the first key;

a step of acquiring a character code corresponding to the center point coordinate value or the center point color value of the first key by searching a first keypad information database provided in advance; and a step of creating a second keypad including a predetermined number of character keys arranged around the first key and displaying the second keypad on the touch screen, or creating a second keypad including a predetermined number of character keys frequently used together with the first key based on a character key use pattern and displaying the second keypad on the touch screen.

11. A method of inputting a character in, a character input apparatus provided with a touch screen, the method comprising:

(a) a step of displaying a first keypad configured of at least one or more character keys on the touch screen in a case of character input mode;

(b) a step of acquiring, if touch of a first key is sensed on the first keypad, a character code corresponding to a value of the first key, creating a second keypad including character keys related to the first key and displaying the second keypad on the touch screen; and (c) a step of displaying, if a touch move action is sensed on the second keypad, a character corresponding to the touch move action on the touch screen, wherein the step (c) includes:

a step of acquiring, if a touch move action is sensed on the second keypad, a center point coordinate, value or a center point color value of a character key according to the touch move action;

a step of extracting a character code corresponding to the center point coordinate value or the center point color value of the character key by searching a second keypad information database provided in advance; and a step of displaying, if the touch movement is completed, a character corresponding to the extracted character code on the touch screen.

12. The method according to claim 10, wherein the step (c) includes:

a step of acquiring, if a touch move action is sensed on the second keypad, a coordinate value according to the touch move action;

a step of detecting touch move direction information through an operation on the center point coordinate value of the first key and the coordinate value according to the touch move action;

a step of extracting a character code corresponding to a combination of the character code of the first key and the touch move direction information by searching, a second keypad information database provided in advance; and a step of displaying, if the touch movement is completed, a character corresponding to the extracted character code on the touch screen.

13. The method according to claim 10, wherein if a touch move action is not sensed on the second keypad, a character corresponding to the acquired character code corresponding to the value of the first key is displayed on the touch screen.

14. The method according to claim 10, wherein the second keypad is created in at least one of upward, downward, leftward, rightward and diagonal directions.

15. The method according to claim 10, wherein the second keypad is visibly or invisibly created inside or outside of the first key of the first keypad.

* * * * *